United States Patent [19]

Latzer

[11] 4,201,918
[45] May 6, 1980

[54] APPARATUS FOR THE ELECTRON BEAM IRRADIATION OF A FLOWABLE MATERIAL, MORE PARTICULARLY SEWAGE SLUDGE

[75] Inventor: Beda Latzer, Winterthur, Switzerland

[73] Assignee: Sulzer Brothers Limited, Winterthur, Switzerland

[21] Appl. No.: 900,622

[22] Filed: Apr. 27, 1978

[30] Foreign Application Priority Data

May 4, 1977 [CH] Switzerland .................. 5556/77

[51] Int. Cl.² .......................................... G01N 23/00
[52] U.S. Cl. ............................. 250/433; 250/432 R; 250/492 B
[58] Field of Search ............... 250/432 R, 433, 437, 250/438, 492 R, 492 B, 453, 455

[56] References Cited

U.S. PATENT DOCUMENTS

| | | | |
|---|---|---|---|
| 1,068,898 | 7/1913 | Henri et al. | 250/433 |
| 2,651,724 | 9/1953 | Hall | 250/433 |
| 4,038,028 | 7/1977 | LaRoche | 250/433 |
| 4,048,504 | 9/1977 | Bosshard | 250/432 R |

*Primary Examiner*—Bruce C. Anderson
*Attorney, Agent, or Firm*—Kenyon & Kenyon

[57] ABSTRACT

The invention relates to an apparatus for the electron beam irradiation of a flowable material, more particularly sewage sludge, the apparatus having a conveying drum moving the material through the electron beam, means for supplying the material to the drum, a resiliently mounted dispensing roller for spreading the material in a thin layer on the drum, a doctor device for removing the material from the drum, and a collecting tank for irradiated material.

20 Claims, 4 Drawing Figures

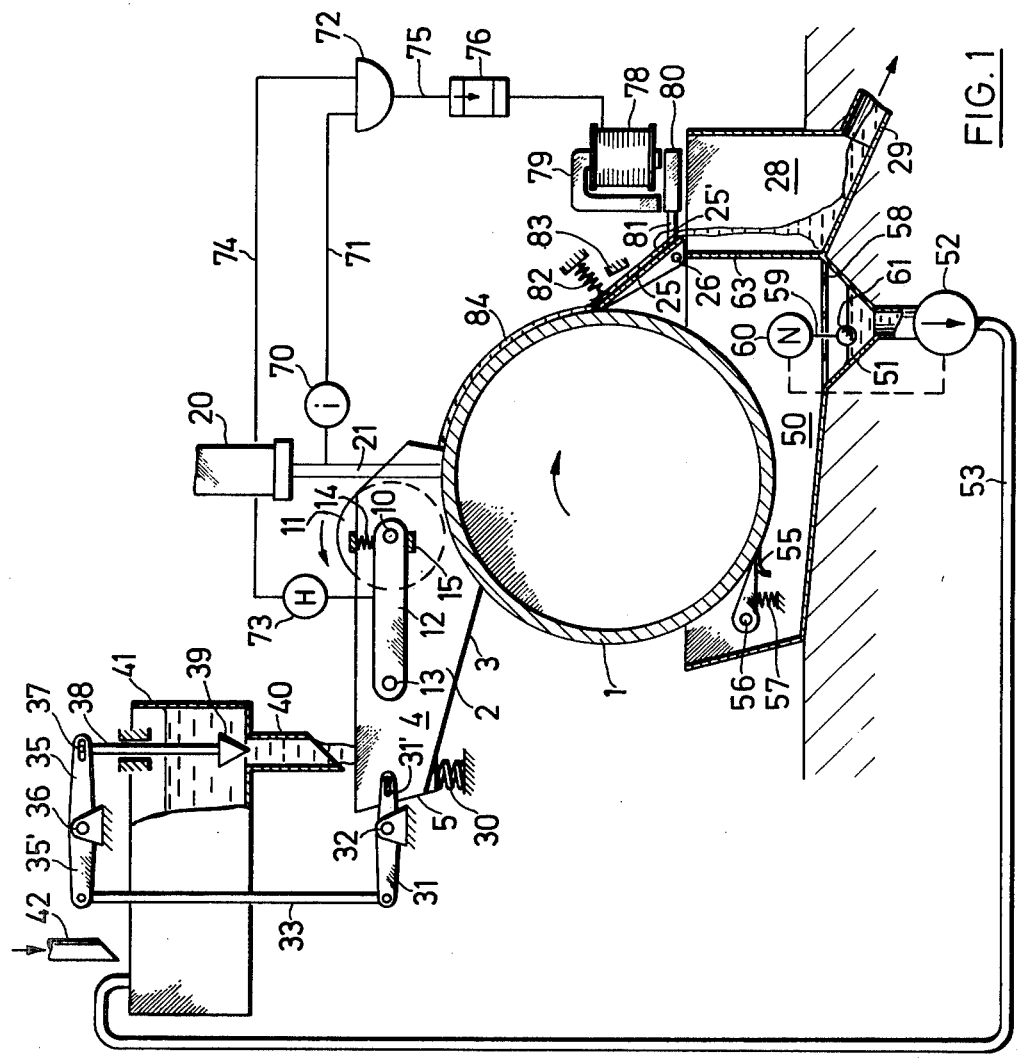

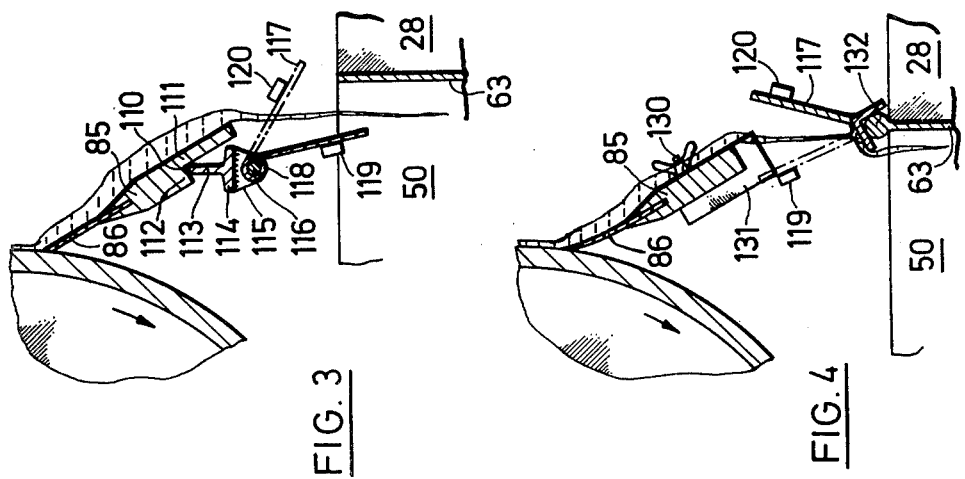
FIG. 3
FIG. 4
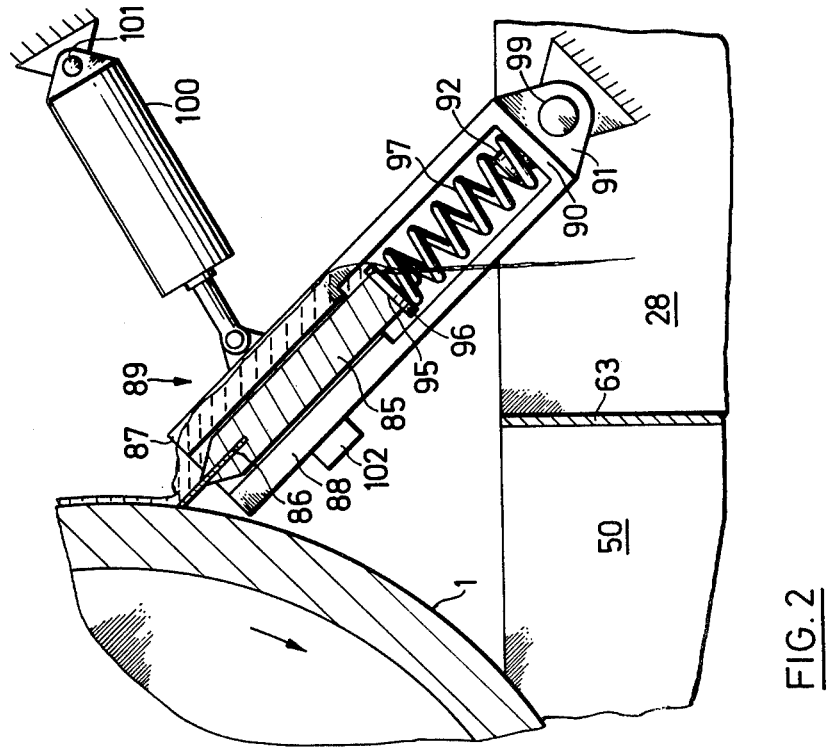
FIG. 2

APPARATUS FOR THE ELECTRON BEAM IRRADIATION OF A FLOWABLE MATERIAL, MORE PARTICULARLY SEWAGE SLUDGE

This invention relates to an electron beam irradiation apparatus.

In one known apparatus for irradiating flowable materials, e.g. as described in the commonly assigned U.S. Pat. Application Ser. No. 883,264, filed Mar. 3, 1978, use is made of a conveying drum for moving the flowable material through an electron beam. In addition, a dispensing roller for spreading the material in a thin layer on the drum is mounted over the drum while a doctor blade is disposed at a later point on the drum to direct the flowable material either into a collecting tank or an intermediate tank. In addition, the dispensing (spreading) roller is resiliently mounted to allow hard foreign bodies larger than the gap between such roller and the drum to pass through without straining the drum or the roller. As such foreign bodies pass through, however, the gap and therefore the thickness of the layer of the flowable material increase briefly. As a result, due to the limited penetrating power of the electron beam radiation, a small proportion of the material fails to receive the required radiation dose. There is therefore a risk of germs passing through the irradiation zone without being killed and subsequently reinfecting the material. The same thing may happen when the intensity of the electron radiation drops below a critical level or even fails completely.

It is an object of the invention to provide an apparatus of the kind defined in which reinfection of the material by germs which have failed to be killed is substantially avoided by simple means.

Briefly, the invention provides an apparatus for treating sludge which is comprised of a rotatably driven drum for conveying the sludge to be treated, means for applying sludge on a drum in a thin layer, an electron beam generator for directing an electron beam radially onto the drum to define an irradiation zone on the sludge carried past the electron beam, a resiliently mounted means adjacent to the drum upstream of the generator for determining the thicknes of the sludge layer on the drum, a collecting tank for receiving irradiated sludge, a trough adjacent the tank for receiving insufficiently irradiated sludge and a doctor blade for removing sludge from the drum. In accordance with the invention, a first pick-off is provided for measuring the intensity of the electron beam and for generating a first signal in response to a preset range of intensity values as well as a second pick-off for sensing movement of the resiliently mounted means from the drum and for generating a second signal in response to a preset range of movement values. Also, a final control element is provided for adjusting the doctor blade relative to the drum between a first position to direct sludge from the drum into the collecting tank and a second position to direct sludge from the drum into the trough. This control element is connected to the pick-offs in order to receive the signals whereby the doctor blade is maintained in the first position associated with the collecting tank in response to the control element receiving both signals from the pick-offs and in being moved into the second position in response to the control element failing to receive at least one of these signals.

In a preferred circuit arrangement, each pickoff is connected to the input of an and-gate whose output is connected to the final control element.

Advantageously, the final control element is in series with a delay element delaying the resetting of the doctor device from the trough to the collecting tank.

Preferably, the doctor blade is pivotable between a position in which the doctor blade contacts the drum and a position in which the doctor blade is clear thereof.

According to a further development of the invention, the doctor blade takes the form of a plate in continuous engagement with the drum and of a pivoted plate so biased by the final control element that in one position the pivoted plate guides the material into the collecting tank and in another position the pivoted plate guides the material into the trough.

According to another feature of this development, the pivoted plate is pivotally mounted on the top edge of the partition between the collecting tank and the trough.

Since the scraping edge of the doctor blade wears, the blade can be in the form of a plate which extends over drum width and in which a scraper blade is releasably secured. The plate of the doctor blade can be guided at both ends in a channel-section member and be spring biased towards the drum.

In order that any material which has stuck to the drum may be removed, more particularly in the case of the disengageable doctor blade, another doctor blade can be provided which is in continuous engagement with the drum.

These and other objects and advantages of the invention will become more apparent from the following detailed description taken in conjunction with the accompanying drawings:

FIG. 1 is a cross-section through an irradiation apparatus according to the invention;

FIG. 2 is a cross-section through a doctor blade, to an enlarged scale;

FIG. 3 is a cross-section through a modified form of doctor blade, and

FIG. 4 is a cross-section through another modified form of doctor blade.

Referring to FIG. 1 the apparatus for treating a flowable material such as sludge includes, a motor (not shown) which rotates a horizontal-axis conveying drum 1 in the direction indicated by an arrow.→←Resting on the drum 1 is a supply funnel 2 embodied by a base member 3, two side walls 4 and a rear wall 5. A shaft 10 extends through vertical slots (not visible) in the side walls 4 and carries a dispensing roller 11 whose end faces engage sealingly with the side walls 4. Each end of shaft 10 is mounted outside a respective side wall 4 in a lever 12; the levers 12 are supported on pivots 13 and are biased by springs 14 into engagement with abutments 15.

Adjacent the dispensing roller 11 is an irradiation zone which extends over the width of the drum 1 between the two side walls 4 and is extended forwardly beyond the roller 11. Issuing from the bottom part 20 of an electron accelerator is an electron beam 21 which oscillates between the two side walls 4 substantially in a radial plane and at high frequency. A doctor blade 25 extends over the width of drum 1 and is mounted on pivots 26. The top scraping edge of the blade 25 bears on the outside surface of drum 1. The discharge edge 25' of the blade 25 is disposed above a collecting tank 28 for irradiated material which can discharge through a spigot 29.

At the left-hand end, the funnel 2 rests on a strong spring 30. A double-armed lever 31 carried in a stationary pivot support 32 is pivotally connected by way of a slot 31' to the funnel 2 at the left-hand end thereof. Pivotally connected to the free arm of lever 31 is a rod 33 which extends to arm 35' of a second double-armed lever 35 which is mounted in a stationary pivot support 36 and whose other arm 37 is adapted to operate a valve spindle 38. Spindle 38 carries a valve lid 39 disposed above an aperture of a discharge spigot 40 of a storage tank 41. Material for irradiation, such as sewage sludge, is supplied to tank 41 through a feed line 42.

Adjacent tank 28 is a trough 50 with an outlet 51, connected to which is the intake side of a sludge pump 52, the delivery side thereof communicating through line 53 with tank 41. Disposed in trough 50 is another doctor blade 55 which is mounted in pivots 56 and which a spring 57 biases into continuous engagement with the drum periphery. A grating 58 separates outlet 51 from trough 50. Extending through grating 58 is a rod 59 of a level detector 60 having a float 61 at a bottom end. Detector 60 controls the throughput of pump 52.

A pickoff 70 provides continuous measurement of the intensity of electron beam 21 and is so devised that in normal conditions, as long as the intensity stays within a preset range of tolerance, a signal is produced, the signal disappearing when the intensity departs from the range of tolerance. The signal is applied through a line 71 to one input of an and-gate 72.

Also, pickoffs 73 disposed on the levers 12 produce a signal in response to normal operating conditions, the signal being applied through a line 74 to the other input of and-gate 72; the latter signal disappears when the distance between the dispensing roller 11 and the drum 1 departs from a preset tolerance range.

The output of and-gate 72 is connected through a line 75 and a delay element 76 to winding 78 of an electromagnet 79 which forms the final control element of the doctor blade 25. Electromagnet 79 has an armature 80 rigidly connected via an arm 81 to the blade 25. While electromagnet 79 is in the energized state, the doctor blade 25 is biased into engagement with drum 1 against the force of a tension spring 82. When the electromagnet 79 ceases to be energized and armature 80 drops, spring 82 pulls the blade 25 away from the drum 1 on to a stop 83.

The apparatus operates as follows:

Sludge issues from tank 41 to funnel 2; the level of sludge therein rises to a particular value because the funnel 2 descends as the weight increases; consequently, the lid 39 tends to be closed by way of the linkage 31, 33, 35. The sludge flows between the rotating drum 1 and roller 11 to engage with the drum 1 in the region of the electron beam 21. The pickoffs 70, 73 both apply their normal-state signal to the inputs of and-gate 72; consequently, the and-gate outputs a signal energizing electromagnet 79 to press doctor blade 25 into engagement with drum 1. The blade 25 therefore guides the irradiated sludge into the tank 28.

When the intensity of the electron radiation decreases or when a relatively large foreign body in the sludge moves the roller 11 too far away from the abutment 15, the normal-state signal disappears from the corresponding input of and-gate 72, with the result that the output thereof and the output of delay element 76 drop to zero. Armature 80 of electromagnet 79 therefore drops and the tension spring 82 rotates the doctor blade 25 away from the drum 1 and into engagement with abutment 83. Consequently, the layer of sludge 84 present on the drum 1 passes by the doctor blade 25 and drops into trough 50 or at the latest is scraped off by scraper 55 and drops into trough 50, for recirculation. This event could be used to trigger a warning signal which could be reset manually after the fault in the doctor blade 25 had been cleared. However, it is preferable to use automatic resetting of the kind shown here. The function of the delay element 76, which becomes operative only for resetting, is as follows:

In the case of a brief fault such that the two normal-state signals quickly reappear at the and-gate 72, it takes some time for the electromagnet 79 to be re-energized and so the doctor blade 25 re-engages with the drum 1 with delay. The delay can be adjusted by means of the delay element 76 and is such that during the delay the drum travels at least the distance from the gap between itself and the roller 11 to the doctor blade 25. This ensures that under-irradiated sludge drops into the trough 50 and not into the tank 28 for irradiated sludge.

If the interruption in scraping of the sludge is caused by a large solid body between the drum 1 and the roller 11, the grating 58, whose mesh can be appropriately small, retains such foreign body. The sludge entering the trough 50 goes through the grating 58 to the sludge pump 52, the pump 52 cutting-in automatically in response to the level of sludge in the outlet 51 reaching a critical value.

In the event both kinds of fault occur simultaneously, there is again an interruption in the scraping of the sludge off the drum 1, for in this event there is no signal at either of the two inputs of the and-gate 72, so that gate 72 has no output signal, with the result that the electromagnet 79 is dead and the doctor blade 25 is disengaged from the drum 1.

The doctor blade shown in FIG. 2 comprises a plate 85 which extends over drum width and in which a scraper blade 86 made e.g. of strip steel is secured releasably. The plate 85 is guided at both ends between arms 87 and 88 of channel-section members 89. The wall thickness thereof is reduced outside the guiding zone. At the rear end, the members 89 have an end member 90 and a lug 91. A pivot 92 for a spring is disposed on member 90. A spring cup 96 is provided at both ends of the plate 85 on the back 95 thereof. A compression spring 97 is disposed between the spring cups 96 and the corresponding end members 90. The members 89 are rotatably mounted at pivots 99. Servomotors 100 which are pivoted to the members 89 and which are supported at pivot points 101 move the members 89 into non-positive engagement with abutments 102.

When the members 89 are in the position shown, the plate 85 presses the blade 86 uniformly on to the drum periphery. The blade 86 wears in operation, the wear being taken up continuously by the springs 97. The irradiated sludge scraped off the drum 1 backs up on the blade 86 and plate 85 and drops from the rear edge of the latter into the collecting tank 28. When signals from the pickoffs 70 or 73 (see FIG. 1 actuate the servomotors 100, the servomotors disengage the members 89 from the abutments 102, the springs 97 raising the plate 85 in the members 89 until the spring cups 96 abut a shoulder of the arms 87, 88. Once the blade 86 has disengaged from the drum 1, the sludge drops from the drum 1 into the trough 50.

Referring to the embodiment of a doctor blade shown in FIG. 3, the plate 85 carrying the blade 86 has on its underside a rebated edge 110. The surfaces 111, 112 forming this edge bear on the "stroke" of a T-section member 113 which, like the plate 85, extends over the whole width of drum 1. A number of lugs 115 carrying a spindle 116 are welded to the underside of flange 114 of member 113. A pivoted plate 117 is suspended on spindle 116 by way of bent-round parts 118 on a top longitudinal edge. Abutments 119, 120 limit the pivoting range of plate 117 which, as described with reference to FIG. 1, a final control element (not shown) pivots from one end position to the other in dependence upon the signals output by the pickoffs 70, 73.

In FIG. 3 the solid-line position of the plate 117 is the position in which the plate 117 guides the scraped-off sludge into the trough 50. In normal operation, the plate 117 is in the chain-dotted-line position in which the scraped-off sludge drops into the tank 28.

In the embodiment shown in FIG. 4, the plate 85 with the blade 86 is so secured by screws 130 to abutments 131 that the blade 86 is bent into engagement with the drum, so that there can be some wear of the blade without the blade having to be readjusted. Unlike the embodiment shown in FIG. 3, in the embodiment shown in FIG. 4, the plate 117 is borne at the bottom end instead of at the top end. Accordingly, the partition 63 has at the top edge between the tank 28 and the trough 50 a cylindrical thickened portion 132 on which a socket-like bottom edge of the plate 117 bears. As previously, the range of pivoting of the plate 117 is limited by abutments 119, 120 and, there is a final control element (not shown) which responds to a decrease in electron beam intensity or to excessive clearance between the roller 11 and the drum 1 by moving the plate 117 into the solid-line position so that the sludge drops into the trough 50.

The advantage of the embodiments shown in FIGS. 1 and 2, where the doctor blade disengages from the drum, over the embodiments shown in FIGS. 3 and 4 is that there is no risk of under-irradiated sludge sticking to the top of the blade 86 or plate 85. After the resetting of the plate 117 in FIGS. 3 and 4, insufficiently-irradiated sludge would enter the tank 28 for irradiated sludge. Such insufficiently-irradiated sludge should therefore be washed before resetting to the trough 50.

Not only electron beam intensity but also the beam oscillation frequency and/or the amplitude of beam oscillation can be supervised and used to control the doctor blade.

Electricity has been used as a signal-transmitting medium in this case only by way of example and the transmitting medium can of course be mechanical or hydraulic or pneumatic.

It is to be noted that the means for applying sludge onto the drum in a thin layer may utilize any suitable resiliently mounted means other than a roller 11. Further, the electron beam generator may be of the type described in U.S. Pat. No. 4,074,138.

I claim:

1. An apparatus for the electron beam irradiation of a flowable material, more particularly sewage sludge, the apparatus having a conveying drum moving the material through the electron beam, means for supplying the material to the drum, a resiliently mounted dispensing roller for spreading the material in a thin layer on the drum, a doctor device for removing the material from the drum, and a collecting tank for irradiated material, characterised in that a final control element is adapted to adjust the doctor device between a position in which the material enters the collecting tank and a position in which the material reaches a trough for material to be recirculated; and the final control element so responds to signals from an electron beam intensity pickoff and from a pickoff responding to the distance between the dispensing roller and the drum that when at least one of the measured values departs from its tolerance range, the doctor device guides the material into the trough.

2. An apparatus according to claim 1, characterised in that each pickoff is connected to the input of an and-gate whose output is connected to the final control element.

3. An apparatus according to claim 1, characterised in that the final control element is in series with a delay element delaying the resetting of the doctor device from the trough to the collecting tank.

4. An apparatus according to any of claims 1 to 3, characterised in that the doctor device is pivotable between a position in which it contacts the drum and a position in which it is clear thereof.

5. An apparatus according to any of claims 1 to 3, characterised in that the doctor device takes the form of a plate in continuous engagement with the drum and of a pivoted plate so biased by the final control element that in one position the pivoted plate guides the material into the collecting tank and in its other position the pivoted plate guides the material into the trough.

6. An apparatus according to claim 5, characterised in that the pivoted plate bears pivotally on the top edge of the partition between the collecting tank and the trough.

7. An apparatus according to claim 1, characterised in that the doctor device takes the form of a plate which extends over drum width and in which a scraper blade is releasably secured.

8. An apparatus according to claim 5, characterised in that the plate of the doctor device is guided at both ends in a chennel-section member and is spring biased towards the drum.

9. An apparatus according to any of claims 1 to 3 and 7, characterised in that another doctor device is provided and is in continuous engagement with the drum.

10. An apparatus for treating sludge comprising
a rotatably driven drum for conveying the sludge to be treated;
means applying sludge on said drum in a thin layer;
an electron beam generator for directing an electron beam radially onto said drum to define an irradiation zone on the sludge carried past said electron beam;
a resiliently mounted means adjacent said drum and upstream of said generator for determining the thickness of the sludge layer on said drum;
a collecting tank for receiving irradiated sludge;
a trough adjacent said tank for receiving insufficiently irradiated sludge;
a doctor blade for removing sludge from said drum;
a first pickoff for measuring the intensity of said electron beam and for generating a first signal in response to a preset range of intensity values;
a second pickoff for sensing movement of said resiliently mounted means from said drum and for generating a second signal in response to a preset range of movement values; and
a final control element for adjusting said doctor blade relative to said drum between a first position to direct sludge from said drum into said collecting tank and a second position to direct sludge from said drum into said trough, said control element being connected to said pickoffs to receive said signals whereby said doctor blade is maintained in said first position in response to said element receiving both signals and is moved to said second position in response to said element failing to receive at least one of said signals.

11. An apparatus as set forth in claim 10 which further comprises an AND-gate connected between said pickoffs and said control element, said gate having a pair of inputs respectively connected to said pickoffs to receive said signals and an output connected to said control element to deliver an energizing signal to said control element in response to said signals.

12. An apparatus as set forth in claim 10 which further comprises a delay element in series with said control element for delaying a resetting of said doctor blade from said second position to said first position.

13. An apparatus as set forth in claim 10 wherein said doctor blade contacts said drum in said first position and is spaced from said drum in said second position.

14. An apparatus as set forth in claim 10 wherein said doctor blade includes a first plate in continuous contact with said drum at one end and a pivotally mounted plate contacting said first plate to pivot said first plate about said one end to direct sludge from said drum into one of said tank and said trough, said pivotally mounted plate being connected with said control element for movement thereby.

15. An apparatus as set forth in claim 14 which further includes a partition separating said tank from said trough and wherein said pivotally mounted plate is pivotally mounted in said partition.

16. An apparatus as set forth in claim 10 wherein said doctor blade includes a plate extending across the width of said drum and a scraper blade for contacting said drum releaseably mounted on said plate.

17. An apparatus as set forth in claim 16 which further comprises a channel-section member having said doctor blade guided therein and at least one spring biasing said doctor blade from said member towards said drum.

18. An apparatus as set forth in claim 10 which further comprises a second doctor blade in continuous engagement with said drum downstream of said dirst doctor blade.

19. In an apparatus for treating sludge, the combination comprising
a rotatably driven drum for conveying the sludge to be treated through an irradiation zone;
a resiliently mounted means adjacent said drum for determining the thickness of the sludge layer on said drum;
a collecting tank for receiving irradiated sludge;
a trough adjacent said tank for receiving insufficiently irradiated sludge;
a doctor blade for removing sludge from said drum;
a pickoff for sensing movement of said means from said drum and for generating a signal in response to a preset range of movement values; and
a final control element for adjusting said doctor blade relative to said drum between a first position to direct sludge from said drum into said collecting tank and a second position to direct sludge from said drum into said trough, said element being connected to said pickoff to receive said signal whereby said doctor blade is moved to said second position in response to said element failing to receive said signal.

20. In an apparatus for treating sludge, the combination comprising
a rotatably driven drum for conveying the sludge to be treated;
an electron beam generator for directing an electron beam radially onto said drum to define an irradiation zone on the sludge carried past said electron beam;
a collecting tank for receiving irradiated sludge;
a trough adjacent said tank for receiving insufficiently irradiated sludge;
a doctor blade for removing sludge from said drum;
a pickoff for measuring the intensity of said electron beam and for generating a signal in response to a preset range of intensity values; and
a final control element for adjusting said doctor blade relative to said drum between a first position to direct sludge from said drum into said collecting tank and a second position to direct sludge from said drum into said trough, said element being connected to said pickoff to receive said signal whereby said doctor blade is moved to said second position in response to said element failing to receive said signal.

* * * * *

UNITED STATES PATENT AND TRADEMARK OFFICE
CERTIFICATE OF CORRECTION

PATENT NO. : 4,201,918
DATED : May 6, 1980
INVENTOR(S) : Latzer, Beda

It is certified that error appears in the above—identified patent and that said Letters Patent is hereby corrected as shown below:

Column 1, line 45, change "thicknes" to -- thickness --.

Column 2, line 47, cancel " --X-- ".

Column 4, line 35, after "that" insert -- the --.

line 62, after "1" insert -- ) --.

Column 5, line 56, change "resilently" to -- resiliently --.

Column 6, line 39, change "chennel" to -- channel --.

Column 7, line 38, change "releaseably" to -- releasably --.

line 46, change "dirst" to -- first --.

Signed and Sealed this

Twenty-third Day of September 1980

[SEAL]

Attest:

SIDNEY A. DIAMOND

Attesting Officer

Commissioner of Patents and Trademarks